United States Patent
Cohn

(10) Patent No.: US 8,837,428 B2
(45) Date of Patent: Sep. 16, 2014

(54) METHOD TO HANDOVER A SUBSCRIBER BETWEEN DIFFERENT BASE STATIONS IN A MULTI-LAYERED WIRELESS NETWORK

(75) Inventor: Daniel Cohn, Ra'anana (IL)

(73) Assignee: Alvarion Ltd. (IL)

( * ) Notice: Subject to any disclaimer, the term of this patent is extended or adjusted under 35 U.S.C. 154(b) by 583 days.

(21) Appl. No.: 13/036,958

(22) Filed: Feb. 28, 2011

(65) Prior Publication Data

US 2011/0211555 A1    Sep. 1, 2011

(30) Foreign Application Priority Data

Mar. 1, 2010   (IL) .......................................... 204219

(51) Int. Cl.
*H04W 4/00*    (2009.01)
*H04W 36/00*   (2009.01)

(52) U.S. Cl.
CPC ...... *H04W 36/0072* (2013.01); *H04W 36/0038* (2013.01); *H04W 36/0055* (2013.01); *H04W 36/0044* (2013.01)
USPC ........................................................ 370/331

(58) Field of Classification Search
None
See application file for complete search history.

(56) References Cited

U.S. PATENT DOCUMENTS

| 2004/0106408 | A1* | 6/2004  | Beasley et al. | 455/436 |
| 2009/0318144 | A1* | 12/2009 | Thomas et al.  | 455/434 |
| 2010/0304743 | A1* | 12/2010 | Jung et al.    | 455/434 |
| 2011/0317665 | A1* | 12/2011 | Jung et al.    | 370/331 |

OTHER PUBLICATIONS

Author Unknown, IEEE 802.16m Draft 4: Part 16: Air Interface for Fixed and Mobile Broadband Wireless Access Systems, Feb. 3, 2010, pp. 1-767.*
I. Jung, K. Ryu, R. Kim, Design format of AAI_NBR-ADV message in 802.16m, Sep. 30, 2009, pp. 1-9.*
I. Jung, K. Ryu, R. Kim, S. Kwak, Update mismatching SFH during HO for IEEE 802.16m, Dec. 30, 2009, pp. 1-6.*
Author unknown, Bluetooth Specification Version 1.1, Feb. 22, 2001, pp. 1-1083.*

* cited by examiner

*Primary Examiner* — John Blanton
*Assistant Examiner* — Christopher Crutchfield
(74) *Attorney, Agent, or Firm* — Hershkovitz & Associates, PLLC; Abe Hershkovitz

(57) ABSTRACT

A method and system are provided for enabling an MS operative in a multi-layer wireless network, to be handed over to a target BS associated with another one of the multi-layers. By the method provided, if it is required that the MS which has not yet been provided with information that relates to a potential target BS associated with a layer different from the one with which its currently serving BS, be handed over to such a target BS, then upon receiving an acknowledgement from the target BS indicating its capability to provide service to the MS, a message is transmitted to the MS that comprises information to enable the MS to perform a fast network re-entry in order to communicate with the target BS. Next, a handover procedure between the MS and the target BS is initiated, during which the MS performs a fast network re-entry.

11 Claims, 2 Drawing Sheets

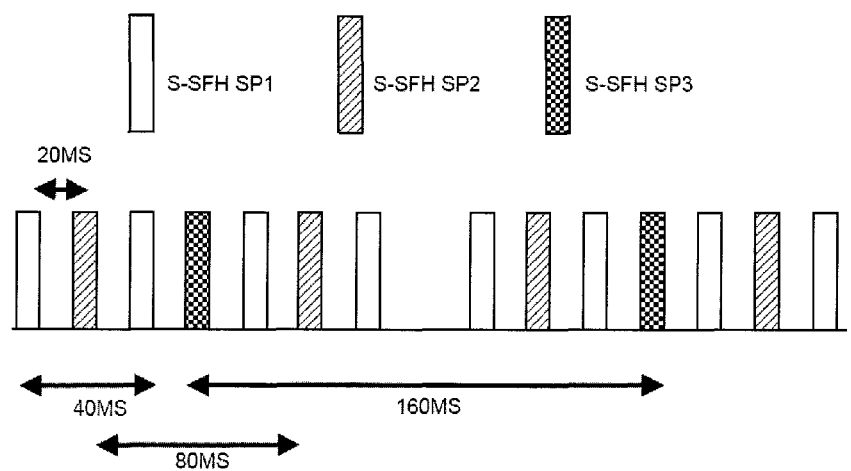
FIG. 1 - PRIOR ART
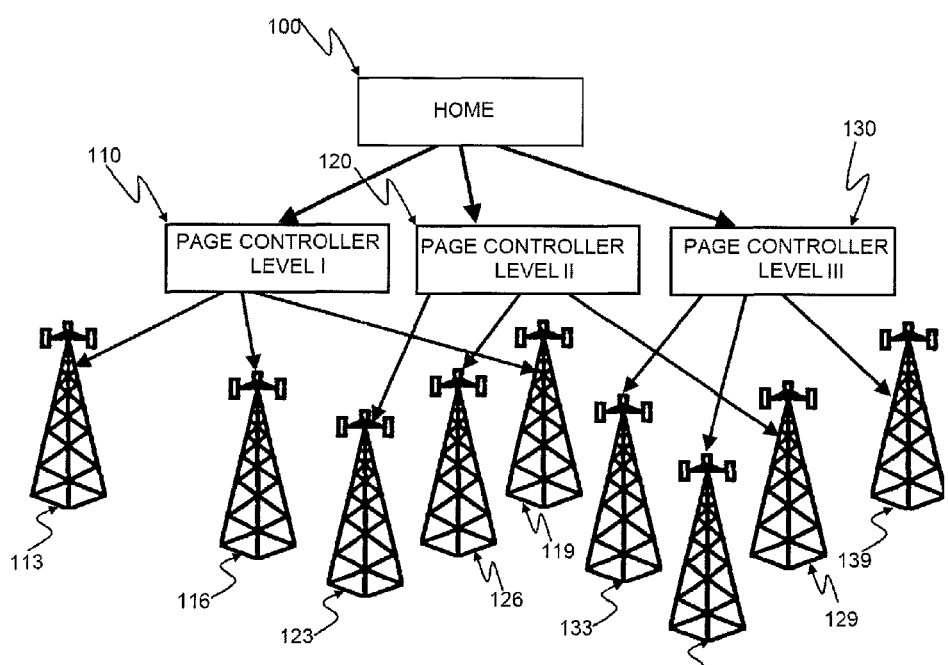
FIG. 2

US 8,837,428 B2

METHOD TO HANDOVER A SUBSCRIBER BETWEEN DIFFERENT BASE STATIONS IN A MULTI-LAYERED WIRELESS NETWORK

TECHNICAL FIELD

The present invention belongs to the field of wireless communications and in particularly to the field of handing over mobile devices which are currently served by one base station, to be served by another.

BACKGROUND

A wireless telecommunications network conventionally comprises a plurality of subscriber terminals such as mobile phones, or wireless local loop terminators which can each communicate with one or more nearby base stations. Each base station is connected to a base station controller or another network element connecting the base station to the rest of the network and each base station controller is connected to a number of base stations. The base station controllers are connected to other network equipment, and by means of that equipment to other networks. In this way a connection can be established from one subscriber terminal to another or to a terminal in one of the other networks.

Nowadays, modern wireless networks are multi-layered networks, where each layer is intricately linked to the other layers in order to cope with the network ever increasing capacity requirements. This deployment requires adequate design and planning of all the technology layers interacting with each other.

SUMMARY OF THE DISCLOSURE

The disclosure may be summarized by referring to the appended claims.

It is an object of the present invention to provide a system and a method for enabling an MS to be handed over to a target BS associated with a layer other than the layer associated with a BS currently serving that MS.

It is another object of the present invention to provide a method and system for enabling an MS to perform fast network re-entry at the target BS associated with a layer other than the layer associated with a BS currently serving that MS.

Other objects of the invention will be described in the following description.

According to a first embodiment, a method is provided for enabling a mobile station (MS) operative in a multi-layer wireless network, to be handed over to a target base station (BS) associated with one layer from among the multi-layer wireless network, being a layer different from the layer associated with a BS currently serving that MS. The method comprising:

providing an MS being currently served by a serving BS associated with a first layer of the multi-layer wireless network, wherein that MS has not yet been provided with information that relates to a potential target BS associated with a second layer of the multi-layer wireless network;

upon receiving an acknowledgement from the target BS indicating its capability to provide service to the MS, transmitting a message to the MS which comprises HO information that enables the MS to perform a fast network re-entry in order to communicate with the target BS; and initiating a handover procedure between the MS and the target BS, during which the MS performs a fast network re-entry.

The term "HO information" used herein throughout the disclosure and claims should be understood to encompass any information or part thereof that is associated with the handover procedure between the MS and the target BS.

As will be appreciated by those skilled in the art, the acknowledgement from the target BS indicating its capability to provide service to the MS, may be received in response to any one of a number of triggering events. For example, when the serving BS determines that the load at its neighboring stations is such that will not allow handing the MS over to any of them, it send a message to other BSs which are associated with other layers, inquiring about their capability to become the target BS for the MS, or the BSs associated with other layers advertize their capabilities to become target BSs based on their current load, etc.

According to another embodiment, the HO information comprised in the message may be transmitted at a same format as information which is comprised in an AAI_NBR-ADV message. For example, the message transmitted may be an "HO-CMD message" or any other message transmitted by the serving BS or the target BS.

According to yet another embodiment, the HO information which is required by the MS in order to communicate with the target BS while carrying out a fast network re-entry, may be comprised in a Secondary SuperFrame Header (S-SFH).

According to still another embodiment, the message transmitted may be divided into a plurality of sub-packets, and the information required by the MS in order to communicate with the target BS while carrying out a fast network re-entry is comprised in a sub-packet included in the plurality of sub-packets. According to a related embodiment, the length of the sub-packet may be variable, e.g. for enabling encoding the HO information in a same format as that of the AAI_NBR-ADV message. In accordance with another related embodiment, at least one sub-packet of the plurality of sub-packets may be fragmentized into more than one fragments, and the more than one fragments are transmitted in more than one consecutive frames.

According to another embodiment the multi-layer wireless network comprises a plurality of channels, and the method provided further comprising conveying each of the plurality of sub-packets along a different channel of the plurality of channels, and wherein the plurality of sub-packets are transmitted periodically along the respective channels, and wherein preferably the transmission periodicity of at least two of these channels is different from each other.

In accordance with an embodiment, the periodically of each channel may be determined by the information comprised in the sub-packet associated with the respective channel.

According to another embodiment, there is provided a system operative in a multi-layer wireless network and adapted to enable an MS to be handed over to a target BS, the system comprising:

a serving BS associated with a first layer of the multi-layer wireless network adapted to periodically provide an MS with information required for the MS to perform a fast network re-entry, wherein that information relates to a plurality of potential targets BS associated with the first layer of the multi-layer wireless network; and a target BS associated with a second layer of the multi-layer wireless network, adapted to communicate with the serving BS and the MS;

wherein the system is characterized in that upon receiving an acknowledgement from the target BS indicating its capability to provide service to the MS, the serving BS is adapted to transmit a message to the MS which comprises HO information to enable the MS to perform a fast network re-entry in order to communicate with the target BS.

According to another embodiment, the HO information comprised in the message transmitted by the serving BS may be of the same format as the information format used in an AAI_NBR-ADV message. The information required for the MS to perform a fast network re-entry in order to communicate with the target BS, may be comprised in a Secondary SuperFrame Header (S-SFH).

By yet another embodiment, the message transmitted by the serving BS may be divided into a plurality of sub-packets, and the information required for the MS to perform a fast network re-entry in order to communicate with the target BS is comprised in a first sub-packet of the plurality of sub-packets.

According to another embodiment, the length of the first sub-packet may be variable, e.g. for enabling encoding the HO information in a same format as that of the AAI_NBR-ADV.

In accordance with still another embodiment, the serving BS may be further adapted to transmit communications along a plurality of channels, wherein each of the plurality of sub-packets is conveyed along a different channel of the plurality of channels, and wherein preferably the transmission periodicity of at least two of these channels is different from each other.

In accordance with a related embodiment, the periodically of each channel may be determined by the information comprised in the sub-packet associated with the respective channel and/or by any other information e.g. information that relates to capacity requirements, workload, bandwidth etc.

According to another embodiment, at least one sub-packet of the plurality of sub-packets may be fragmentized into more than one fragments, and the serving BS is further adapted to transmit more than one fragments in more than one consecutive frames, e.g. one fragment per frame.

BRIEF DESCRIPTION OF THE DRAWINGS

FIG. 1—illustrates an S-SFH message partitioned into three sub packets according to the prior art solution;
FIG. 2—demonstrates an example of a multi-layer network, which is implemented in one embodiment.

DETAILED DESCRIPTION

Figure 3:
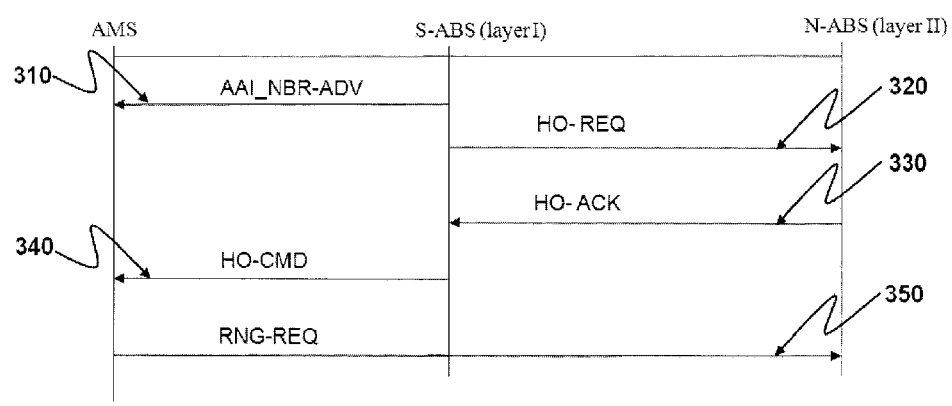
FIG. 3—illustrates transmission of messages according to one embodiment.

In the following description, for the purposes of explanation, numerous specific details are set forth in order to provide a thorough understanding of the present invention. It should be apparent, however, that the present invention may be practiced without these specific details. Also, a further description of certain embodiments of the present invention is included in the Applicant's contribution entitled "Format of SFH and delta encodings in AAINBR-ADV (16.2.3)" submitted as a contribution to IEEE 802.16m, a contribution which is incorporated in its entirety by reference into the specification.

According to the IEEE 802.16m Standard, an Advanced Base Station (ABS) should periodically broadcast system information which relates to its neighboring ABSs, using an AAINBR-ADV message. The AAI_NBR-ADV message may sort neighbor ABSs (RSs) according to their deployment types, and provide the subscriber with information regarding their availability in case that the latter requires to carry out a handover process. A serving ABS may unicast the AAINBR-ADV message to an Advanced Mobile Station (AMS). The AAI_NBR-ADV message typically includes parameters that are required for such a handover (HO) process, e.g., current cell load and cell type associated with the neighboring BSs/ABSs. The ABS may broadcast different fragment of AAI_NBR-ADV independently.

An AAI_NBR-ADV message includes information for the AMS which relates to the advertised neighboring ABSs, in order to expedite the AMS network re-entry (such information may include for example frequency partition information, cell bar information, ranging channel description, etc.). This information may be comprised in the SuperFrame Header (SFH). The SFH carries essential system parameters and system configuration information. The SFH is usually divided into two parts: Primary SuperFrame Header (P-SFH) and Secondary SuperFrame Header (S-SFH), and is located at the first sub-frame within a superFrame. Traditionally, the S-SFH message is partitioned into three Sub-Packets (SPs) which contain different S-SFH elements. SP1 includes elements required for network re-entry, SP2 includes elements required for network entry and discovery and SP3 contains all the remaining elements. The SPs may be periodically transmitted by the ABS, with different period length (e.g. 40 ms, 80 ms and 160 ms for SP1, SP2 and SP3 respectively as illustrated in the FIG. 1). S-SFH SPs are transmitted in the first sub-frame within a superframe, together with the P-SFH. According to the IEEE 802.16m Standard, the P-SFH and S-SFH can occupy up to 24 Distributed Logical Resource Units (DLRUs) in the sub-frame. The motivation for this limitation is to ensure the SFH can be transmitted in a single sub-frame, even for the lowest channel bandwidth supported (5 MHz), in a coding rate that provides reasonable coverage. However, the SFH size limitation imposes a rigid restriction on the size of the SPs and makes SP design difficult and in particular precludes future extension of the SPs (e.g. to support additional features in later standard revisions).

As mentioned before, it is a common practice for an AMS operating in a multi-layered wireless network, to initiate a mobility-triggered HO. The information on the potential target base stations is derived by the AMS from information provided by its respective serving ABS, and relates to neighbors of that serving ABS, which are located at the same layer of the network. However, there are times in which the ABS wishes to initiate a HO of an AMS being served by its serving ABS, to a neighbor ABS that is not advertised in the AAI_NBR-ADV message. One such scenario is of a multi-layered network where the policy is to use AMS-initiated handover for mobility-triggered handover within each layer and to use ABS-initiated handover for load-triggered handover between layers. In this scenario, the ABS does not advertise inter-layer neighbor ABSs in order to avoid AMSs attempting to be handed over to those inter-layer neighbor ABSs. Consequently, the AMS does not have SFH information for the target ABS and thus is unable to perform fast network re-entry.

Another scenario may occur when the ABS experiences overload of traffic. If the potential target base stations are those which are the neighbors of the ABS which are located at the same layer of the multi-layered wireless network, then the AMS may still use the available information advertised in the AAI_NBR-ADV message, as explained before. However, the fact that the network is a multi-layered network, may open further options for potential target base stations, ones that are located at a different layer of the network, of which the AMS is unaware.

FIG. 2 illustrates an example of a multi-layered network which comprises three controllers (110, 120 and 130) each representing different layer, and all three of them are operative to communicate with the same home agent (100) and with a plurality of ABSs. Controller 110 communicates with ABSs 113, 116 and 119, controller 120 communicates with ABS 123, 126 and 129, while controller 130 communicates with ABSs 133, 136 and 139. Now, let us assume that ABS 136 serves a large number of AMSs, and experiences a heavy traffic load. In order to balance the load, ABS 136 wishes to initiate a controlled HO to another ABS. One option would be to do so to one of its neighbors ABSs (133 and 139), but it could well happen that they might also be rather loaded. Thus, the present invention provides a method to enable ABS 136 to initiate a HO process for one of its AMS to ABS that is located at a different network layer. The problem in the case lies with the fact that ABS 136 has not advertised the inter-layer neighbor potential target ABS (e.g. 129) in the AAI_NBR-ADV massage in order to avoid AMSs initiating a handover process to approach ABS 129. Thus, none of the one or more AMSs which ABS 136 wishes to hand over, has SFH information to allow it to approach the target ABS 129 and consequently it cannot perform a fast network re-entry. However, by the present example, ABS 136 transmits SFH updates (deltas) that relate to the ABS SFH, in the HO-CMD message, where the SFH delta format may be at the same format as that of the AAI_NBR-ADV. According to one embodiment the SFH delta information is encoded in type-value format, where the type is derived from the order of the field in the SP1 message, starting from zero. For instance, the "LSBs of 48 bit ABS MAC ID" field in the SP1 message appears in the second position, therefore its type in the delta SFH encodings is encoded as 1. Moreover the length of the SFH SP1 may be a variable length, to enable encoding the SFH delta information in a same format as that of the AAI_NBR-ADV, thus enabling the one or more AMSs to perform fast network re-entry via inter-layer handover.

FIG. 3 is a schematic example of a message flow in the network illustrated in FIG. 2. The first message is transmitted from serving ABS (136), which is a unicast of an AAINBR-ADV message to the specific AMS that should be handed over, for example the process may begin by having S-ABS 136 sending an AAI_HO-CMD to initiate the HO procedure. The AAI_NBR-ADV message in this example includes HO related parameters like cell load and cell type regarding ABSs 133 and 139 but will not comprise any information that relates to ABS 129. All of the HO related information is comprised in the SuperFrame Header (SFH) of the AAI_NBR-ADV message. Next, let us assume that ABS 136 determines that the AMS should be handed over to ABS 129. That can be done by any one of a number of methods known in the art per se, for example, once ABS 136 establishes that the AMS cannot be handed over to either ABS 133 or 139, it interrogates ABS 129 by sending a HO-REQ thereto.

Upon receiving acknowledgement form ABS (129), the serving ABS (136) sends a HO-CMD message to the AMS, which comprises (in addition to the known parameters) the SFH deltas (i.e. the data that would have been sent to the AMS in the AAI_NBR-ADV if ABS 129 were included in the AAI_NBR-ADV). The SFH delta has the same format as of the AAI_NBR-ADV and it may include each target potential ABS of different layers that were not included in the normal AAI_NBR-ADV messages sent by ABS 136 for identifying the target ABS. The last message shown in FIG. 3 is the first message of the HO procedure carried out between the AMS and the target ABS 129, and by relying on the information included in the SFH delta, the AMS is now able to perform a fast network re-entry.

The SFH delta information may be encoded as a sequence of type-value pairs, where the one-byte type field encodes the S-SFH field type, defined as the order in which the field appears in the S-SFH SP1 IE format. The length of the value fields follows the definition for each S-SFH SP1 IE field.

The following table demonstrates an implementation of one embodiment by which Table 687 of the IEEE P802.16m/D4 Standard is amended in order to comply with this embodiment. References shown in Table 1, relate to this IEEE publication.

TABLE 1

| Syntax | Size (bit) | Note |
| --- | --- | --- |
| AAI_NBR-ADV_Message_format ( ){ | | |
| Management Message Type = NN | 8 | |
| Change Count | 3 | NBR-ADV Change Count |
| Cell type | 3 | Cell type in this message<br>0b000 macro<br>0b001 micro<br>0b010 macro hotzone<br>0b011 femto<br>0b100 relay<br>0b101-0b111 reserved |
| Total Number of AAI_NBR-ADV Segments | 4 | Total number of segments of AAI_NBR-ADV for this cell type |
| AAI_NBR-ADV Segment Index | 4 | Indicates current segment index of this message in the specific cell type |
| BS number M | 8 | Total number of BSs to be included in this AAI_NBR-ADV segment |
| Starting ABS Index | 8 | Starting ABS Index is the index offset from the last ABS of the previous AAI_NBR-ADV segment. If this is the first AAI_NBR-ADV segment, the Starting ABS Index will be 0. Hence, each AAI_NBR-ADV segment has one Index which corresponds to the first ABS in that AAI_NBR-ADV segment. |
| for (i=0; i<M; i++) { | | |
| BSID | 48 | |
| Number of carriers (NC) | | Number of carriers of the BS |
| for( j=0; j<NC; j++) { | | |
| SA-PREAMBLE index | 10 | |
| A-PREAMBLE transmit power | 8 | |
| Physical carrier index | 6 | Refer to the physical carrier index in AAI_Global-Config message |
| MAC protocol versions | 8 | MAC protocol version of the BS<br>Consistent with REV.2 definition, with new MAC protocol version 9 defined for 16m. |
| } | | |
| SFH_encoding_format | 2 | 0b00: full Subpkt information<br>0b01: delta encoding (the 1st BS in this cell type shall use full Subpkt encoding )<br>0b10: no SFH included<br>0b11: reserved<br>For macrocell ABS, the bitmap shall be either 0b00 or 0b01 |
| If( SFH_encoding_ format=00) { | | //encoding format type-1 |
| SFH Subpkt 1 length | 1 | Length of SFH Subpkt 1 in bytes |
| SFH Subpkt 1 | Variable | //exclude those fields already in cell type info |
| } | | |
| If( SFH_encoding_format =01) { | | |
| Delta information length | 1 | Length of transmitted delta information in bytes |
| Delta information | Variable | Delta encoding, w.r.t. the |

TABLE 1-continued

| Syntax | Size (bit) | Note |
|---|---|---|
| } | | able reference BS |

According to another embodiment a new S-SFH structure based on the concept of S-SFH containers is proposed. By this embodiment, the S-SFH channel may be a container for SP fragments, where for example S-SFH's first channel may carry data currently associated with SP1. S-SFH channels may be transmitted periodically with the same period length as described above for the different SPs. When SDUs within S-SFH channels are fragmented, fragments are transmitted in consecutive superframes. One advantage of this embodiment is that the SP size is no longer limited by the capacity of a single subframe and therefore SPs may be extended without being subjected to this limitation. Thus, instead of using three Sub-Packets (SPs) to update the S-SFH IEs, the S-SFH channel IEs may be transmitted by ABS at the scheduled period of each channel, respectively, with different periodicity (i.e., $T_{C1} < T_{C2} < T_{C3}$). The SP scheduling periodicity information may be transmitted in the S-SFH SP3 IE. According to one embodiment each S-SFH channel (channels 1, 2 and 3) carries fragments of the corresponding S-SFH sub packets (SP1, SP2 and SP3 respectively). If an S-SFH sub packet is comprised of $N_{frag}$ fragments, the corresponding S-SFH channel is transmitted over consecutive $N_{frag}$ superframes. This is indicated by the more fragments field of the S-SFH IE.

According to yet another embodiment the Secondary Superframe Header (S-SFH) may be transmitted in every superframe. If the S-SFH is present, the S-SFH will be mapped to the NS-SFH distributed LRUs following the NP-SFH distributed LRUs. The value of NS-SFH is indicated in P-SFH IE. The S-SFH can be repeated over two consecutive superframes.

The information transmitted in S-SFH is divided into three sub-packets, which are carried by three S-SFH channels. The channels of S-SFH are transmitted periodically where each channels has a different transmission periodicity.

The following table demonstrates an implementation of an embodiment, by way of amending Table 807 of the IEEE P802.16m/D4 Standard by presenting the transmission periodicity of different S-SFH channels for different values of "channel scheduling periodicity information" field. References shown in Table 2 relate to this IEEE publication.

TABLE 2

| Channel scheduling periodicity information | Transmission periodicity of S-SFH Channel 1 | Transmission periodicity of S-SFH Channel 2 | Transmission periodicity of S-SFH Channel 3 |
|---|---|---|---|
| 0000 | 40 ms | 80 ms | 160 ms |
| 0001 | 40 ms | 80 ms | 320 ms |
| 0010-1111:resereved | | | |

According to one embodiment the S-SFH IE is mapped to the S-SFH. Essential system parameters and system configuration information belonging to the S-SFH are categorized into three SPs. These SPs are carried by S-SFH channels 1, 2 and 3 respectively. These channels are transmitted at different timing and periodicity. For example the periodicity of each channel ($T_{Ci}$) may be determined as $T_{C1} < T_{C2} < T_{C3}$. Table 3 demonstrates the implementation of this embodiment by way of amending Table 810 of the IEEE P802.16m/D4 Standard.

TABLE 3

| Syntax | Size (bit) | Notes |
|---|---|---|
| S-SFH IE format ( ) { | | |
| If (1st bit of S-SFH Scheduling information bitmap == 1) { | | |
| Fragment index | 4 | The index of the SP1 fragment transmitted in this superframe. Values are 0 . . . 15 |
| More fragments | 1 | When set, indicates another fragment of SP1 will be transmitted in the following superframe header. |
| S-SFH SP1 IE ( ) } | | |
| Fragment index | 4 | The index of the SP2 fragment transmitted in this superframe. Values are 0 . . . 15 |
| More fragments | 1 | When set, indicates another fragment of SP2 will be transmitted in the following superframe header. |
| if (2nd bit of S-SFH Scheduling information bitmap == 1) { | | |
| S-SFH SP2 IE ( ) } | | |
| Fragment index | 4 | The index of the SP3 fragment transmitted in this superframe. Values are 0 . . . 15 |
| More fragments | 1 | When set, indicates another fragment of SP3 will be transmitted in the following superframe header. |
| S-SFH SP 3 IE( ) } | | |

The terms "comprises", "comprising", "includes", "including", "having" and their conjugates mean "including but not limited to". These terms encompass the terms "consisting of" and "consisting essentially of".

As used herein, the singular form "a", "an" and "the" include plural references unless the context clearly dictates otherwise.

It should be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference.

The invention claimed is:

1. A method for enabling a mobile station (MS) operative in a multi-layer wireless network, to be handed over to a target base station (BS) associated with one layer from among the multi-layer wireless network, being a layer different from the layer associated with a BS currently serving that MS, the method comprising:

provided an MS being currently served by a serving BS associated with a first layer of the multi-layer wireless network with information required for the MS to perform a fast network re-entry, wherein that information relates to a plurality of potential BS targets associated with the first layer of the multi-layer wireless network, wherein said MS has not yet been provided with information that relates to a potential target BS associated with a second layer of said multi-layer wireless network;

upon receiving an acknowledgement from the target BS indicating its capability to provide service to said MS, transmitting a message to the MS which comprises HO information that enables the MS to perform a fast network re-entry in order to communicate with the target BS; and initiating a handover procedure between the MS and the target BS, during which the MS performs a fast network re-entry, wherein the HO information required by the MS to perform a fast network re-entry in order to communicate with the target BS is comprised in a Secondary SuperFrame Header (S-SFH).

2. The method according to claim 1, wherein the message transmitted is divided into a plurality of sub-packets, and the information required for the MS in order to communicate with the target BS while carrying out a fast network re-entry is comprised in a sub-packet of said plurality of sub-packets.

3. The method according to claim 2, wherein the length of said sub-packet is variable.

4. The method according to claim 2, wherein the multi-layer wireless network comprises a plurality of channels, and the method further comprises conveying each of the plurality of sub-packets along a different channel of the plurality of channels, and wherein the plurality of sub-packets are transmitted periodically along the respective channels.

5. The method according to claim 2, wherein at least one sub-packet of the plurality of sub-packets is fragmentized into more than one fragments, and the more than one fragments are transmitted in more than one consecutive frames.

6. The method according to claim 4, wherein the periodically of each channel is determined by the information comprised in the sub-packet associated with the respective channel.

7. A system operative in a multi-layer wireless network and adapted to enable an MS to be handed over to a target BS, the system comprising:

a serving BS associated with a first layer of said multi-layer wireless network adapted to provide an MS with information required for the MS to perform a fast network re-entry, wherein that information relates to a plurality of potential targets BS associated with said first layer of said multi-layer wireless network; and a target BS associated with a second layer of the multi-layer wireless network, adapted to communicate with the serving BS and the MS;

wherein the system is characterized in that upon receiving an acknowledgement from the target BS indicating its capability to provide service to said MS, the serving BS is adapted to transmit a message to the MS which comprises HO information that enables the MS to perform a fast network re-entry in order to communicate with the target BS, wherein the information required for the MS to perform fast network re-entry at the target BS is comprised in a Secondary SuperFrame Header (S-SFH).

8. The system according to claim 7, wherein the message transmitted is divided into a plurality of sub-packets, and the information required for the MS to perform a fast network re-entry in order to communicate with the target BS is comprised in a first sub-packet of the plurality of sub-packets.

9. The system according to claim 8, wherein the length of the first sub-packet is variable.

10. The system according to claim 8, wherein the serving BS is further adapted to transmit communications along a plurality of channels, wherein each of the plurality of sub-packets is conveyed along a different channel of the plurality of channels, and wherein the plurality of sub-packets are transmitted periodically along the respective channels.

11. The system according to claim 8, wherein at least one sub-packet of the plurality of sub-packets is fragmentized into more than one fragments, and the serving BS further adapted to transmit more than one fragments in at least two consecutive frames.

* * * * *